US012643585B2

(12) United States Patent
Strub et al.

(10) Patent No.: US 12,643,585 B2
(45) Date of Patent: Jun. 2, 2026

(54) TRAFFIC NETWORK AND METHOD FOR OPERATING RAIL VEHICLES IN A TRAFFIC NETWORK CONSISTING OF A COMBINATION OF LINE SECTIONS WITH TRAIN PROTECTION AND LINE SECTIONS WITHOUT TRAIN PROTECTION

(71) Applicant: Siemens Mobility GmbH, Munich (DE)

(72) Inventors: Leo Strub, Braunschweig (DE); Carlsson Scholl, Teltow (DE)

(73) Assignee: Siemens Mobility GmbH, Munich (DE)

( * ) Notice: Subject to any disclaimer, the term of this patent is extended or adjusted under 35 U.S.C. 154(b) by 176 days.

(21) Appl. No.: 18/458,333

(22) Filed: Aug. 30, 2023

(65) Prior Publication Data

US 2024/0067243 A1 Feb. 29, 2024

(30) Foreign Application Priority Data

Aug. 30, 2022 (EP) .................................... 22192956

(51) Int. Cl.
*B61L 27/04* (2006.01)
*B61L 25/02* (2006.01)
(Continued)

(52) U.S. Cl.
CPC ............. *B61L 27/04* (2013.01); *B61L 25/025* (2013.01); *B61L 27/10* (2022.01); *B61L 27/20* (2022.01);
(Continued)

(58) Field of Classification Search
CPC .. B60Y 2200/30; B61L 25/025; B61L 25/026; B61L 27/04; B61L 27/10;
(Continued)

(56) References Cited

FOREIGN PATENT DOCUMENTS

| CN | 110588726 A | * 12/2019 | .............. B61L 27/40 |
| KR | 101262036 B1 | 5/2013 | |

OTHER PUBLICATIONS

Cleirec, Remi et al: "Le Saeiv", Revue Generale des Chemins de Fer: RCGF, HC Editions, FR [Le SAIEV—An intelligent transport system for the tram-train in dense areas], Nr. 243, Nov. 1, 2014 (Nov. 1, 2014), pp. 6-20, XP001526566, full machine translation. (Year: 2014).*

(Continued)

*Primary Examiner* — Mark L. Greene
(74) *Attorney, Agent, or Firm* — Laurence A. Greenberg; Werner H. Stemer; Ralph E. Locher

(57) ABSTRACT
A method for operating rail vehicles in a traffic network, which includes a reserved operating area that is reserved for the rail vehicles and a shared operating area which is shared with traffic participants other than the rail vehicles. A computer-assisted method for train control is performed automatically in the reserved operating area. The method for automatic train control is also performed in a computer-assisted manner in the shared operating area, wherein automatic train protection does not take place but automatic operation and supervision do take place. Using a range of functions modified thus, continuous train tracking is advantageously realized. There are also described a traffic network for operating rail vehicles, a rail vehicle for operation in a traffic network, and a computer program and an associated delivery device.

8 Claims, 2 Drawing Sheets

(51) Int. Cl.
B61L 27/10 (2022.01)
B61L 27/20 (2022.01)

(52) U.S. Cl.
CPC ..... *B60Y 2200/30* (2013.01); *B61L 2027/204* (2022.01)

(58) Field of Classification Search
CPC .. B61L 27/20; B61L 99/002; B61L 2027/202; B61L 2027/204
See application file for complete search history.

(56) References Cited

OTHER PUBLICATIONS

Zhang, Z: CN 110588726, machine translation. (Year: 2019).*
Wikipedia, "Communications-based train control", captured Jul. 13, 2022, accessed Apr. 18, 2025. (Year: 2022).*
Cleirec et al: "Le SAEIV", Revue Generale des Chemins de Fer: RCGF, HC Editions, FR, No. 243, Nov. 1, 2014 (Nov. 1, 2014), pp. 6-20, ISSN: 0035-3183 describes the SAEIV (Système d'Aide à l'Exploitation et à l'Information Voyageurs) system.
Cleirec, Remi et al: "Le SAEIV", Revue Generale des Chemins de Fer: RCGF, HC Editions, FR [Le SAIEV—An intelligent transport system for the tram-train in dense areas], Nr. 243, Nov. 1, 2014 (Nov. 1, 2014), pp. 6-20, XP001526566, English abstract.
McCullough, Ian: "Trends in modern mass-transit train control", Signal und Draht: Signalling & Datacommunication, Eurailpress, DE, Bd. 100, Nr. 10, Oct. 1, 2008 (Oct. 1, 2008), pp. 41-47, XP001515418.

* cited by examiner

TRAFFIC NETWORK AND METHOD FOR OPERATING RAIL VEHICLES IN A TRAFFIC NETWORK CONSISTING OF A COMBINATION OF LINE SECTIONS WITH TRAIN PROTECTION AND LINE SECTIONS WITHOUT TRAIN PROTECTION

CROSS-REFERENCE TO RELATED APPLICATION

This application claims the priority, under 35 U.S.C. § 119, of European Patent Application EP22192956.5, filed Aug. 30, 2022; the prior application is herewith incorporated by reference in its entirety.

FIELD AND BACKGROUND OF THE INVENTION

The invention relates to a method for operating rail vehicles in a traffic network. In addition, the invention relates to a traffic network for operating rail vehicles. Furthermore, the invention relates to a rail vehicle for operation in a traffic network. Finally, the invention relates to a computer program and a delivery device for the computer program, the computer program having program instructions for performing the method.

In the train protection mode (in an operating area that is reserved for rail vehicles) of trams which travel underground, use is made, for example, of CBTC (Communication-Based Train Control). A computer-assisted method based on two-way communication is therefore performed in this case, providing centralized train supervision and operations management with the subsidiary functions of automatic train protection, automatic operation, and automatic supervision. When running on sight without automatic train protection (i.e., in an operating area which is shared with other traffic participants), use is normally made of intermittent one-way communication (e.g., using IMU coupling coils, IMU: inductive transmission of indications) between train and line. The areas are handled separately in this implementation. Therefore precise train tracking in operating areas that are shared with other traffic participants and when running on sight is not possible for the operator. Only operating areas that are reserved exclusively for rail vehicles are represented in the operations control system. The cockpit of the train has an HMI (human-machine interface) for the reserved operating area with automatic train protection (train protection mode).

In the case of metro and subway systems as well as in main-line long distance systems, use is often made of continuous supervision in order to prevent overrunning at danger points, e.g., in the case of ETCS (European Train Control system), PTC (Positive Train Control) and CBTC (Communication-Based Train Control). Continuous supervision allows automatic train control by applying continuous train running operation and removes the need to install a multiplicity of trackside devices, though said system of continuous supervision is considerably more expensive in other contexts. In the case of trams which sometimes run underground or traverse lengthy tunnels, continuous supervision is only performed there, e.g., CBTC. For overground train operation, however, the train movement must be effected by a driver (running on sight) due to a greater complexity of the traffic situation (traffic participants such as cars, bicycles and pedestrians must be taken into consideration). Use is made here of trackside devices such as coupling coils which are installed at the track in the road and corresponding communication components in the vehicle, these being provided solely for the purpose of indication transmission and having no safety-relevant function.

The cited components for running on sight require a certain amount of structural space. In the case of so-called low-floor vehicles (e.g., trams) in particular, where the space between vehicle floor and track is limited, problems relating to space arise when installing the cited components in the underfloor region in particular. Moreover, said components incur certain servicing costs in order to prevent faults. In particular, in the case of trams, components that are installed in the track are traversed not only by the tram but also by other vehicles which use the road. This places an increased mechanical stress on the components, which also increases their susceptibility to failure.

The document CLEIREC ET AL: "Le SAEIV", REVUE GENERALE DES CHEMINS DE FER: RCGF, HC EDITIONS, FR, No. 243, 1 Nov. 2014 (2014-11-01), pages 6-20, ISSN: 0035-3183 describes the SAEIV system (Systéme d'Aide á l'Exploitation et á l'Information Voyageurs—support system for operation and passenger information), which was designed and built specifically for the parts of the tram/train lines outside the national rail network and allows location-finding of the trains on the line.

SUMMARY OF THE INVENTION

The object of the invention is to specify a method and a traffic network (containing lines consisting of railroads) for operating rail vehicles, which, with the least possible technical and/or financial expenditure in relation to components that are installed in particular at or in the track in the shared operating area, ensure the greatest possible functionality both in an operating areas that are reserved solely for train traffic and in traffic areas that are shared with other traffic participants. It is an additional object of the invention to specify a computer program by means of which the cited method can be performed, and a delivery device for the computer program.

With the above and other objects in view there is provided, in accordance with the invention, a method for operating rail vehicles in a traffic network, which includes a reserved operating area that is reserved for the rail vehicles, and a shared operating area which is shared between the rail vehicles and traffic participants other than the rail vehicles, the method comprising:

deploying a computer-assisted method based on two-way communication in the reserved operating area for centralized automatic train supervision and operations management in a train protection system which accesses an infrastructure that corresponds to specific safety requirements; and deploying the method for centralized automatic train supervision and operations management also in the shared operating area, wherein:
  automatic train protection does not take place, but automatic operation and supervision do take place; and in the shared operating area, using by the train protection system functional components of a further infrastructure, other than the infrastructure that corresponds to the specific safety requirements, the further infrastructure being also available to the traffic participants other than the rail vehicles.

In other words, the objects of the invention are achieved in that a method for automatic supervision (also referred to as train supervision) and operation (also referred to as operations management) is also performed in a computer-assisted manner in an operating area which is shared with other traffic participants—where automatic train protection is not implemented. In other words, provision is made such that the method for automatic train supervision and operations management is also performed in the shared operating area, with a range of functions which is modified in comparison with the range of functions in the area that is reserved for the rail vehicles.

In the reserved operating area, use is made of a computer-assisted method based on two-way communication for the purpose of centralized automatic operation, supervision and train protection. In the context of this invention, two-way communication means that data is transmitted from the rail vehicle to the trackside and from the trackside to the rail vehicle. In this case, suitable communication devices are used in the rail vehicle and in the traffic network. These can be embodied in accordance with the CBTC standard (primarily in the reserved operating area) or inventively also use the V2X standard (primarily in the shared operating area).

By means of automatic operation and supervision, it is advantageously possible to realize continuous train tracking, while running on sight can be performed by a driver for the purpose of train protection in the shared operating area, i.e., the train driver assumes complete responsibility for safety. Continuous train tracking also allows position-finding of the train if, as in the case of a gradual system change (migration from old technology to new technology), use is still being made of trackside devices (e.g., induction loops or balises) which are provided in the traffic network for the purpose of position-finding. This allows the train schedule to be adapted in the event of delays, for example. For this purpose, position-finding of rail vehicles moving in the traffic network, with regard to geographical or temporal density, is necessary in order to allow the adaptation of the train schedule or the completion of other tasks which are based on the position-finding. The word "continuous" relates here to a density of position-finding occurrences (occurrence of successful position-finding of the rail vehicle) which reliably allows the respective task to be executed. This can technically also be achieved by means of e.g., quasi continuous position-finding, in which a finite number of position-finding occurrences is present on a specific line section. Quasi continuous position-finding is therefore understood to be included in the concept "continuous".

The fact that related automatic functions for train protection are not included in the modified range of functions means that these must be performed manually, for example. In particular, such manual performance is effected by a train driver who is responsible for running on sight and therefore performs functions which correspond to the automatic function concerned.

The inventive method has a multitude of advantages.

By virtue of the invention, running on sight requires neither the line devices in the track nor the corresponding vehicle antennas that would necessarily be deployed in a conventional system for intermittent transmission of indications (e.g., IMU). This results in significant savings and solves problems related to the installation of the required vehicle coupling coils in the underfloor region, particularly in low-floor trams. Instead, a location-finding and data transmission system together with the associated combination antennas (e.g., GPS, mobile radio networks, WLAN) are installed in the vehicle in order to transmit data relating to the applications that are realized. By virtue of using a data communication system such as e.g., V2X in the vehicle, the solution can be realized relatively economically. Since a train protection mode is forgone, it is possible to make use of e.g., COTS components (COTS: components off the shelf, i.e., standard and therefore easily available and economical components). COTS components can also be deployed in the traffic network, and might already be present as a result of using a partial V2X infrastructure in particular, said components having been previously installed for other traffic participants of the shared operating area (e.g., users of motorized individual transport). It is thereby possible to economize installation costs at least to the extent that previously installed components can be used.

A preferably reduced set of components which is adapted to the modified range of functions for running on sight can be installed at the trackside, or use can be made of an infrastructure such as e.g., V2X which is already installed in the shared operating area.

The invention differs from existing systems in that no trackside devices, or at least fewer trackside devices, are required along the line.

Therefore the system inventively offers digital space-saving functions which are easy to realize, in particular also for tram systems, without costly installation of devices under the vehicle floor and in the track bed. Therefore the digital or virtual functions can preferentially also be deployed in low-floor vehicles with limited space (e.g., trams).

Further advantages are listed in the following in the form of key points.

Continuous capture and reporting of the vehicle position to allow train tracking in quasi real time.

Two-way data exchange between line and train. This is advantageously ensured by the transmission technology that is predetermined by the automatic train protection system in the reserved operating area.

Two-way communication in order to allow messages (text/voice) from traffic control to driver and vice versa. This is advantageously ensured by the transmission technology that is specified by the automatic train protection system in the train protection area.

Simplification and standardization of interfaces to the line infrastructure and on the vehicle. This means that at the latest following complete replacement of existing and generally one-way transmission technologies that are installed in the track, it will be possible to rely on a unified transmission technology which is then deployed both in the reserved operating area and in the shared operating area.

Particularly in traffic networks which include both running on sight areas and reserved operating areas, complete integration of the different areas into a combined traffic management system is achieved, such that comprehensive visibility and (albeit limited in the shared operating area) controllability of the trains in the entire traffic network is provided (i.e., in shared operating areas just as in reserved operating areas).

The possibility of integrating e.g., a tramway into a comprehensive standardized traffic management system of a town/district/conurbation. This can extend beyond rail-based traffic to include road traffic systems such as e.g., traffic signals or bus routes.

The use of all the infrastructure equipment of an automatic train control system in the shared operating area is not economical and is not necessary. An operator prefers a needs-based investment-optimized equipment of the rail network according to the requirements profile (train protection mode vs. running on sight). This is where the teaching of the invention applies, according to which a modified range of functions is provided for the running on sight area. This is prefer-ably divested of safety-relevant functions which must be assumed by a train driver when running on sight. It is therefore possible to install an infrastructure which has a reduced range of functions in the running on sight area. For example, sensors that are required for auto-matic train operation can be omitted.

As little hardware as possible in the track, in order to reduce servicing and maintenance costs and at the same time ensure greater flexibility with regard to changes or extensions. This is advantageously ensured by install-ing an infrastructure for the modified range of func-tions, a complete infrastructure being installed in the reserved operating area.

The replacement/migration of old indication transmission technology, since it is foreseeable that the existing system will soon be obsolete. The installation of an infrastructure for automatic train control can produce synergy effects here, said infrastructure ideally offering investment protection with its standardized future-com-patible technology. This applies likewise to the hard-ware that is deployed. Said hardware should likewise be based as far as possible on standardized compo-nents.

A further advantage is the upgradability. For example, it is possible gradually to transfer the automatic train operation (train protection mode) into the shared oper-ating area when the technology for this is sufficiently mature. In this case, it is then only necessary to install those infrastructure components required for automatic train operation, an upgrade being more economical than equipping from scratch in such cases. It is then possible e.g., to envisage the deployment of driverless trams in both the reserved operating areas and the shared operating areas.

In the context of the invention, the terms "computer-assisted" or "computer-implemented" should be understood to signify an implementation of the method in which at least one computer or processor executes at least one method step of the method.

The expression "computer" covers all electronic devices having data processing properties. Computers can be e.g., personal computers, servers, handheld computers, mobile radio devices and other communication devices which pro-cess data in a computer-assisted manner, processors and other electronic devices for data processing, which can preferably also be linked to a network via interfaces.

A "processor" in the context of the invention is under-stood to be, for example, a converter, a sensor for generating measured signals or an electronic circuit. A processor can be in particular a main processor (Central Processing Unit, CPU), a microprocessor, a microcontroller, or a digital signal processor, possibly in combination with a storage unit for storing program instructions and data. A processor is also understood to be a virtual processor or a soft CPU.

A "storage unit" in the context of the invention is under-stood to be, for instance, a computer-readable storage unit in the form of working memory (Random Access Memory, RAM) or data storage (hard disk or data medium).

"Interfaces" can be realized in the form of hardware, for instance, via cable or radio connection, and/or in the form of software, e.g., as an interaction between individual program modules or program parts of one or more computer pro-grams.

"Program modules" are understood to be individual func-tion units which support an inventive program sequence of method steps. These function units can be realized in a single computer program or in a plurality of intercommunicating computer programs. The interfaces that are realized here can be implemented in the form of software within a single processor or in the form of hardware if a plurality of processors are deployed.

A modified range of functions is primarily understood to be a range of functions which contains only functions that are classified as not safety-relevant for the operation of the rail vehicle (no automatic train protection, but automatic operation and supervision). According to the international standard IEC 61508 and according to the European standard EN 50129 specifically for the railway environment, four different Safety Integrity Levels (SIL-1 to SIL-4) or safety requirement levels are defined for safety functions. Accord-ing to this, Safety Integrity Level 4 (SIL-4) represents the highest level and Safety Integrity Level 1 (SIL-1) the lowest level of safety integrity. The respective Safety Integrity Level influences the confidence interval of a measured value to the effect that the confidence interval becomes progres-sively smaller as the Safety Integrity Level that is to be satisfied by the respective device increases. Therefore limi-tations are produced as a result of comparatively imprecise measured values and the associated comparatively large confidence interval, in particular for systems which satisfy the higher Safety Integrity Levels SIL-4 or SIL-3. The degree of safety of the different Safety Integrity Levels is clearly shown in the expected frequency of failure of the safety-relevant system, also referred to as MTBF (Mean Time Between Failures). This lies in the range of 10 to 100 a for SIL-1, in the range of 100 to 1,000 a for SIL-2, in the range of 1,000 to 10,000 a for SIL-3, and in the range of 10,000 to 100,000 a for SIL-4.

If the modified range of functions comprises only func-tions which are not safety-relevant, this has the advantage that the trackside hardware infrastructure which is used for running on sight need not itself satisfy the requirements for increased safety. According to the invention, use is made of the knowledge that the train driver is responsible for safety-relevant functions when running on sight, and therefore the functions that are so implemented as to be automatic do not themselves jeopardize the safety of the operation of the rail vehicle.

The continuous position-finding of the rail vehicle in a shared operating area can be cited as an example. This is not used for safety-relevant functions of the railway operations. In other words, the driver will make driving decisions for the vehicle that is running on sight on the basis of their own judgments and irrespective of the determined position. The position-finding can however be used for applications that are not safety-relevant (so-called comfort functions) such as e.g., an adaptive train schedule. With regard to such a function, if the position that is determined as a result of position-finding does not correspond to the actual position, this does not affect the safety of the rail vehicle as such but would merely result in a train schedule that might not be sufficiently optimized. The resulting delays would however not represent any safety risk to the users of the rail vehicle.

According to an embodiment of the invention, provision is made for the automatic operation and supervision together to realize at least one of the following functions: determin-ing and transmitting arrival information of the rail vehicles; operations management with a possibility to optimize the train schedule; continuous train tracking.

These functions are referred to as comfort functions above. Comfort functions are characterized in that, with regard to safety considerations, they are not necessary for the operation of the rail vehicle. However, the provision of comfort functions improves usability with regard to the operation of the rail vehicles in the traffic network concerned. Such improvements may be found in the performance of the operation, e.g., closer time sequencing of successive trains in the traffic network. Or also in improvements in respect of usage by passengers, e.g., by predicting the actual arrival times of a rail vehicle in the station. Overall, the comfort functions that are offered result in greater popularity among passengers and thus advantageously in wider use.

According to an embodiment of the invention, in the shared operating area, provision is made for the use of functional components which are also available to other traffic participants beside the rail vehicles. In other words, resources in the form of functional components are shared, specifically between the rail vehicles and other traffic participants. This is made possible by the use of a standard technology such as e.g., V2X, which is already fairly widespread in motorized individual transport.

The sharing of resources with other traffic participants (which are not rail vehicles), e.g., V2X resources, renders the solution proposed according to this embodiment particularly cost-effective. In other words, the inventive traffic network which allows the inventive method to be performed can be constructed without investment or at least with limited investment in the hardware infrastructure at the trackside. This means that in train protection mode the train protection system accesses an infrastructure which corresponds to the safety requirements, and when running on sight accesses another infrastructure, which preferably already exists, in order to realize the desired function that is not safety-relevant. As a consequence, the comfort functions can be seamlessly provided both in train protection mode and when running on sight, thereby advantageously making it significantly easier to realize these comfort functions (irrespective of whether this takes place automatically or e.g., in an operations control center) and creating additional potential for the realization of the comfort functions in the overall traffic network.

According to the invention, further aspects should also be considered.

Interfaces to all third-party systems allow the creation of an overall system.

Ease of servicing and installation because infrastructure components are installed above ground at the trackside and are easily accessible.

Flexibility and ease of modification by means of software settings on easily accessible components.

Communication with components of the road infrastructure. The currently existing infrastructure of towns (e.g., traffic light systems) can easily be integrated here, since a uniform communication standard is realized.

Two-way continuous train-to-line communication.

Ease of migration with almost identical functionality to the conventional indication transmission technology (IMU, infrared, analog radio). Use of standards for hardware and communications.

Comfort functions (train tracking, route setting and train regulation) of a CBTC system are extended into shared operating areas. As part of this, an interface is created at operations control level so that information from the shared operating area (in standardized format) can be processed accordingly and a uniform display can be realized in the shared and reserved operating areas. The objective is integration into central planning, dispatching, train regulation and train schedule management.

With regard to the vehicle, comfort functions will also be integrated into the train HMI (Human Machine Interface), which is currently only active in train protection mode (preferably CBTC).

According to an embodiment of the invention, provision is made such that the method for automatic train control is based on CBTC.

Communication-Based Train Control (CBTC) refers to systems for automatic train control and for the protection of train movements, in which two-way data communication takes place between vehicle and line equipment, and precise track-clear indication is used independently of line equipment such as track circuits, thereby allowing moving block operation. The basic function of the system can be extended to include door control or passenger information. The requirements and the general system architecture of CBTC systems are defined, for example, in the IEEE standard 1474.1.

With the above and other objects in view there is provided, in accordance with the invention, a traffic network for operating rail vehicles. The traffic network comprises a reserved operating area which is reserved for the rail vehicles and a shared operating area which is shared between the rail vehicles and traffic participants other than the rail vehicles;

the reserved operating area being configured for centralized train supervision and operations management via a computer-assisted method that is based on two-way communication;

the shared operating area being configured for implementation of automatic train supervision and operations management via a computer-assisted method in which automatic train protection does not take place; but automatic operation and supervision do take place.

There is also provided, in accordance with the invention, a rail vehicle for operation in the traffic network. In the reserved operating area, the rail vehicle is subject to centralized automatic train supervision and operations management via a computer-assisted method based on two-way communication. In the shared operating area, the rail vehicle is also subject to automatic train supervision and operations management via a computer-assisted method in which automatic train protection does not take place; but automatic operation and supervision do take place. That is, according to the invention, the method for automatic train supervision and operations management can also be performed in a computer-assisted manner in the shared operating area (GBB), wherein during the performance of the method automatic train protection does not take place but automatic operation and supervision do take place.

Using the cited devices, it is possible to achieve the advantages previously explained in connection with the method described in detail above. The explanations relating to the inventive method also apply correspondingly to the inventive devices.

With the above and other objects in view there is also provided a computer program containing program modules, having program instructions for performing the cited inventive method and/or exemplary embodiments thereof, it being possible to perform the inventive method and/or exemplary embodiments thereof by means of the computer program.

Finally, there is also provided a delivery device for storing and/or delivering the computer program. The delivery device, by way of example, is a memory or storage unit which stores and/or delivers the computer program. Alternatively and/or additionally, the delivery device is e.g., a network service, a computer system, a server system, in particular a distributed, e.g., cloud-based computer system and/or virtual processing system, which stores and/or delivers the computer program, preferably in the form of a non-transitory data stream.

The delivery is effected in the form of a block of program data as a file, in particular a download file, or as a data stream, in particular a download data stream, of the computer program. This delivery can however also be effected e.g., as a partial download consisting of a plurality of parts. Such a computer program is read into a system, e.g., using the delivery device, such that the inventive method is caused to execute on a computer.

Further details of the invention are described below with reference to the drawing. Identical or corresponding drawing elements are denoted by identical reference signs in each case and are only explained more than once if there are differences between the individual figures.

The exemplary embodiments explained in the following are preferred embodiment variants of the invention. In the exemplary embodiments, the components described in respect of the embodiment variants represent in each case individual features of the invention which are to be regarded independently of each other and in each case develop the invention independently of each other and must therefore be considered as part of the invention either individually or in a combination other than that shown. Furthermore, the components that are described can also be combined with the features of the invention described above.

The construction and method of operation of the invention, together with additional objects and advantages thereof will be best understood from the following description of specific embodiments when read in connection with the accompanying drawings.

BRIEF DESCRIPTION OF THE FIGURES

As mentioned above, identical and functionally equivalent elements are identified with the same symbols and reference numerals throughout the figures.

DETAILED DESCRIPTION OF THE INVENTION

Figure 1:
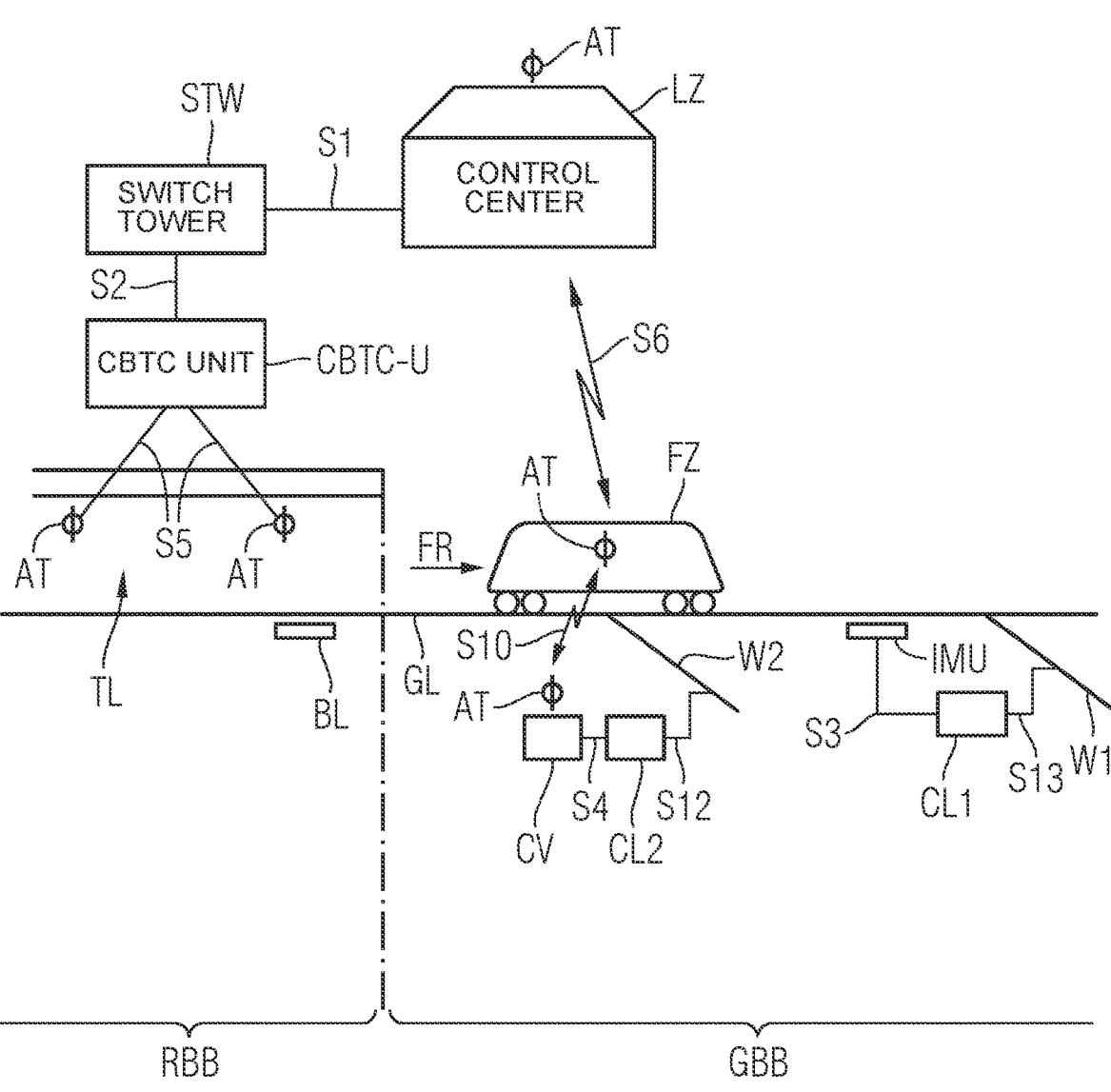
FIG. 1 is a schematic illustration of an exemplary embodiment of the inventive devices in the form of the traffic network and the rail vehicle and their active interdependencies.

FIG. 1 schematically illustrates a traffic network which by way of example is provided by a track GL, of the line (or track) forming part of the traffic network, for a vehicle FZ which is moving in a direction of travel FR. The line has a reserved operating area RBB in which only rail vehicles FZ are allowed to move. This is the case in a tunnel TL. There is also a shared operating area GBB, as is customary e.g., in the case of trams. In this shared operating area GBB, other traffic participants (pedestrians, cyclists, motor vehicles) who are not shown in detail in FIG. 1 can cross over the track GL or travel within the area of the track GL.

The track GL can have trackside devices such as, for example, a balise BL and a further open-line element IMU, this taking the form of an inductive electrical loop. The open-line element IMU is embedded in the substrate bearing the track GL and is not illustrated in greater detail. Also illustrated are controlled elements W1, W2 in the form of switches (or points). These determine the path of the rail vehicle FZ in the traffic network. The controlled elements W1, W2 are activated by controllers CL1, CL2, which implement corresponding control commands.

In the case of the first controlled element W1, a control command is forwarded from the open-line element IMU via a third interface S3 to the first controller CL1, which implements said control command via a thirteenth interface S13 in order to set the first controlled element W1. In the case of the second controlled element W2, a control command is initiated e.g., via a tenth interface S10, said tenth interface S10 being a radio interface between two antennas AT which are situated respectively in the rail vehicle FZ and in a processing unit (e.g., a converter) CV. According to the invention, this can be, for example, a V2X interface. The processing unit CV converts the signal that is received via the tenth interface S10 and sends it via a fourth interface S4 to the second controller CL2. In this case, the signal that is converted by the processing unit CV is available in the same format as the signal that is generated by the open-line element IMU and transferred via the third interface S3 to the first controller CL1. Therefore the second controller CL2 can give a control command to the second controlled element W2 via a twelfth interface S12.

As illustrated in FIG. 1, the open-line element IMU transfers a signal via the third interface S3 as a function of the rail vehicle FZ passing over it. In this respect, the open-line element IMU is designed as a sensor for detecting the passage of rail vehicles FZ. However, as shown for the controlled element W2, this open-line element can be replaced by the processing unit CV, thereby allowing direct transmission of a signal from the rail vehicle FZ via its antenna AT (tenth interface S10). In this context, use is made of an IT infrastructure as per the V2X standard, which is at least to some extent already present in the traffic network and can be retrofitted economically into the rail vehicle using COTS components.

In the traffic network, a network which allows communication is formed by a multiplicity of antennas AT. Also involved here is an operations control center LZ, in which, by way of example, adaptive train plans can be created and which assists in the coordination of a CBTC method in the reserved operating area RBB. For this purpose, the operations control center LZ communicates via a first interface S1 with a switch tower STW, which in turn communicates via a second interface S2 with a CBTC unit CBTC-U for the purpose of performing a CBTC method in the tunnel TL. A balise in the tunnel is however a so-called fixed-data balise, which participates in the performance of the CBTC method.

The rail vehicle FZ communicates via a sixth interface S6 with the operations control center LZ. Further interfaces may be provided, even if this is not illustrated in FIG. 1. For example, the rail vehicle FZ communicates with antennas AT in the tunnel TL via interfaces that are not shown, so that a connection can be established via the interface S5 to the CBTC unit CBTC-U. It is however important that the train protection mode in the tunnel TL is based on CBTC, and the running on sight whereby a driver (not shown) drives the rail vehicle FZ is based on a service which has a modified range of functions in comparison with the automatic traffic management, said service allowing automatic operation and supervision of the rail vehicle to be performed. This service preferentially makes use of the V2X standard for the purpose of communication.

11

Figure 2:
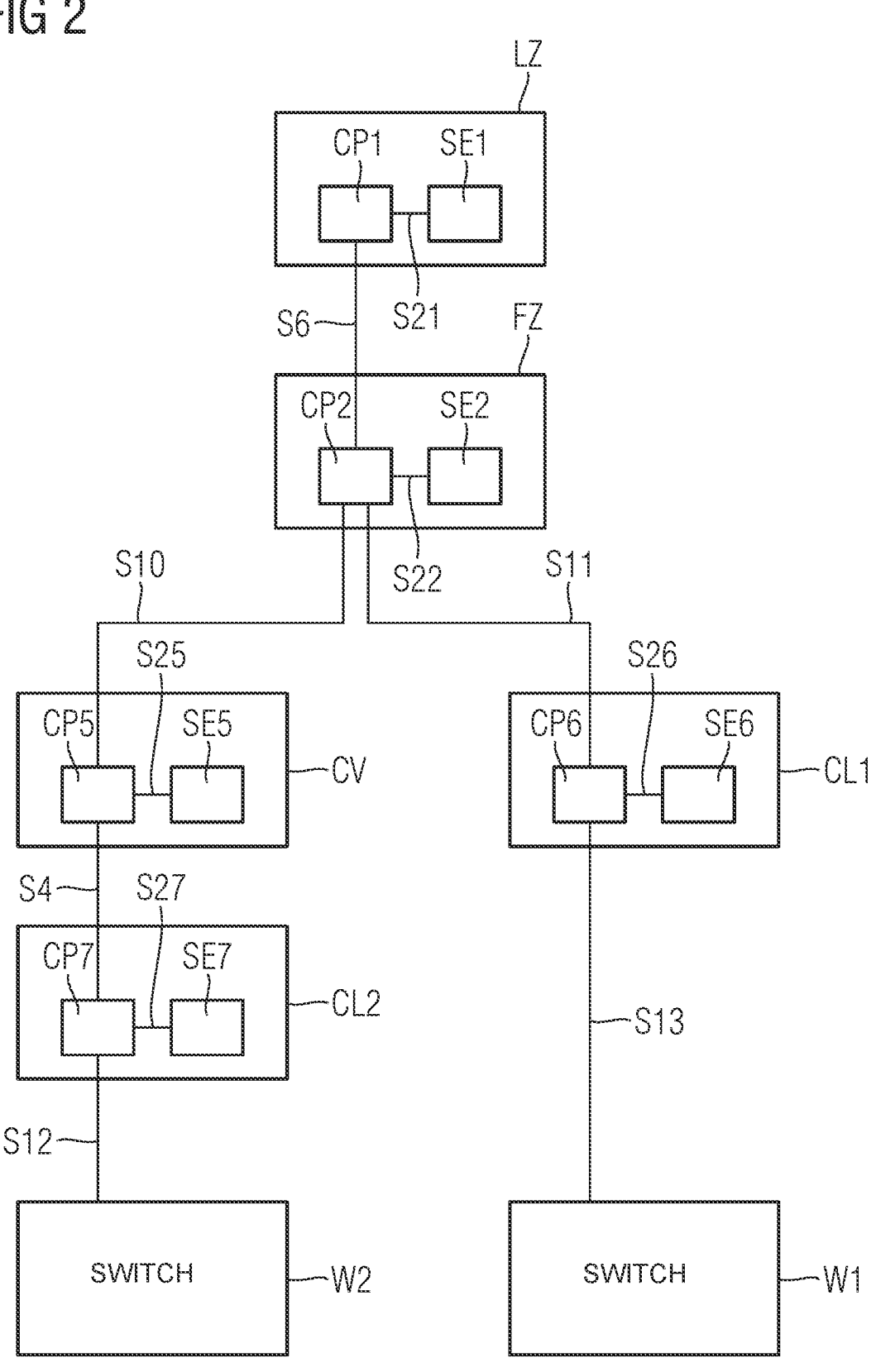
FIG. 2 is a functional block diagram of an exemplary embodiment of a computer infrastructure of the device from FIG. 1, the individual function units executing program modules which can in each case run on one or more processors, and the interfaces being embodied in software or hardware accordingly.

FIG. 2 shows how a network corresponding to the illustration in FIG. 1 can be constructed for the shared operating area (GBB). The operations control center LZ has a first computer CP1 with a first storage unit SE1, or memory unit, which is connected via a twenty-first interface S21 to the first computer CP1. The computer CP1 of the operations control center LZ communicates via the sixth interface S6 with a computer CP2 in the rail vehicle FZ. Details of the transmission technology are not shown in FIG. 2. For the purpose of communication, the rail vehicle FZ has the second computer CP2, which is connected via a twenty-second interface S22 to a second storage unit SE2. The second computer CP2 communicates via the tenth interface S10 with a fifth computer CP5 in the processing unit CV, which likewise has a fifth storage unit SE5 that is connected to the fifth computer CP5 via a twenty-fifth interface S25. The fifth computer CP5 communicates via the fourth interface S4 with a seventh computer CP7 of the second controller CL2, the seventh computer CP7 being connected via a twenty-seventh interface S27 to a seventh storage unit SE7. The second controller CL2 can activate the second controlled element W2 by means of the seventh computer CP7 via the twelfth interface S12.

The eleventh interface S11 allows the rail vehicle FZ to communicate also with a sixth computer CP6 of the first controller CL1. This consists in a train passing over the open-line element IMU, a signal being inductively triggered thereby. The first controller CL1 likewise has a sixth storage unit SE6, which is connected via a twenty-sixth interface S26 to the sixth computer CP6. For its part, the sixth computer CP6 can activate the first controlled element W1 via the thirteenth interface S13.

The following is a summary list of reference symbols and numerals and the corresponding structure used in the above description of the invention:

LZ Operations control center
FZ Vehicle
FR Direction of travel
GL Track
AT Antenna
STA Line section
W1, W2 Controlled element (points)
CL1, CL2 Controller
CV Processing unit (converter)
BL Balise
TL Tunnel
RBB Reserved operating area
GBB Shared operating area
IMU Open-line element
STW Switch tower
CBTC-U CBTC unit
CP1-CP7 Computer
SE1-SE7 Storage unit
S1-S13 Interface
ZSB Train protection mode
SFB Running on sight
SIL1-SIL4 Protected operating mode
NSIL Unprotected operating mode
CBTC Train control step
TRF Transfer step
INF Information step
INF_OT Output step for information
STB Control instruction
STB_OT Output step for control instruction
HMB Manual instruction by train driver
HMB_IN Input step for manual instruction
The invention claimed is:

12

1. A method for operating rail vehicles in a traffic network, which includes a reserved operating area that is reserved for the rail vehicles, and a shared operating area which is shared between the rail vehicles and traffic participants other than the rail vehicles, the method comprising:
   providing a computer assisted method, based on two-way communication, for centralized automatic train supervision and operations management with subsidiary functions of automatic train protection, automatic operation, and automatic supervision which optionally take place;
   deploying the computer-assisted method for centralized automatic train supervision and operations management which accesses an infrastructure that corresponds to specific safety requirements in the reserved operating area, wherein automatic train protection, automatic operation, and automatic supervision take place; and
   deploying the method for centralized automatic train supervision and operations management also in the shared operating area, wherein:
      automatic train protection does not take place, but
      automatic operation and automatic supervision do take place; and
   in the shared operating area, using functional components of a further infrastructure, other than the infrastructure that corresponds to the specific safety requirements, the further infrastructure being also available to the traffic participants other than the rail vehicles.

2. The method according to claim 1, which comprises performing at least one of a continuous train tracking or position-finding as part of the automatic supervision.

3. The method according to claim 2, further comprising at least one of the following functions with the automatic operation and automatic supervision:
   determining and transmitting arrival information of the rail vehicles; and
   operations management for optimizing a train schedule.

4. The method according to claim 1, wherein the method for centralized automatic train supervision and operations management is based on Communication-Based Train Control (CBTC).

5. A non-transitory storage unit comprising program instructions which, when executed on a computer, cause the computer to perform the method according to claim 1.

6. A computer program carrier comprising the non-transitory storage unit according to claim 5.

7. A traffic network for operating rail vehicles, comprising:
   a reserved operating area which is reserved for the rail vehicles and a shared operating area which is shared between the rail vehicles and traffic participants other than the rail vehicles;
   said reserved operating area being configured for centralized automatic train supervision and operations management via a computer-assisted method, based on two-way communication, with automatic train protection, automatic operation, and automatic supervision configured to take place, and said computer-assisted method accesses an infrastructure that corresponds to specific safety requirements;
   said shared operating area being configured for implementation of centralized automatic train supervision and operations management via a computer-assisted method in which:
   automatic train protection does not take place; but
   automatic operation and automatic supervision do take place; and in the shared operating area, functional components of a further infrastructure, other than said infrastructure that corresponds to the specific safety requirements, are utilized, and the further infrastructure being also available to the traffic participants other than the rail vehicles.

8. A rail vehicle for operation in a traffic network, wherein the traffic network includes:

a reserved operating area which is reserved for rail vehicles; and a shared operating area which is shared between rail vehicles and traffic participants other than rail vehicles; and wherein, in the reserved operating area, the rail vehicle is subject to centralized automatic train supervision and operations management via a computer-assisted method, based on two-way communication, with automatic train protection, automatic operation, and automatic supervision configured to take place, and said computer-assisted method accesses an infrastructure that corresponds to specific safety requirements; and in the shared operating area, the rail vehicle is subject to centralized automatic train supervision and operations management via a computer-assisted method in which:

automatic train protection does not take place; but automatic operation and automatic supervision do take place; and in the shared operating area, functional components of a further infrastructure, other than said infrastructure that corresponds to the specific safety requirements, are utilized, and the further infrastructure being also available to the traffic participants other than the rail vehicles.

* * * * *